US008583887B1

(12) United States Patent
Patel et al.

(10) Patent No.: US 8,583,887 B1
(45) Date of Patent: Nov. 12, 2013

(54) NON-DISRUPTIVE RESTORATION OF A STORAGE VOLUME

(75) Inventors: Manish D. Patel, Pleasanton, CA (US); Boris Teterin, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 690 days.

(21) Appl. No.: 12/263,328

(22) Filed: Oct. 31, 2008

(51) Int. Cl.
G06F 13/00 (2006.01)
G06F 13/28 (2006.01)

(52) U.S. Cl.
USPC .............. 711/163; 711/161; 711/E12.091

(58) Field of Classification Search
None
See application file for complete search history.

(56) References Cited

U.S. PATENT DOCUMENTS

| 7,711,978 | B1 * | 5/2010 | Roy et al. ............... 714/5.11 |
| 7,962,709 | B2 * | 6/2011 | Agrawal ................. 711/162 |
| 2004/0230877 | A1 * | 11/2004 | Clark et al. ............ 714/48 |
| 2007/0168713 | A1 * | 7/2007 | Kern et al. ............. 714/12 |
| 2008/0183988 | A1 * | 7/2008 | Qi ....................... 711/162 |

* cited by examiner

Primary Examiner — Matthew Bradley
Assistant Examiner — Eric S Cardwell
(74) Attorney, Agent, or Firm — Perkins Coie LLP (57) ABSTRACT

A system implements a method to non-disruptive restoration of storage services provided by a storage volume of the system. Upon detecting a disruption of storage services at the storage volume, the method freezes the input/output (I/O) operations of applications that are accessing the storage volume. The disrupted storage services are restored. And the configurations of the storage volume are maintained during restoration of the disrupted storage services. Afterward, the frozen I/O operations are activated, allowing the applications to continue their accessing of the storage volume.

26 Claims, 4 Drawing Sheets

NON-DISRUPTIVE RESTORATION OF A STORAGE VOLUME

FIELD OF THE INVENTION

At least one embodiment of the present invention pertains to network storage systems, and more particularly, to non-disruptive restoration of storage services provided by network storage systems.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

In a SAN environment, storage services provided by a storage server can be integrated into a client system's operating system in such a way that, to the user applications running on the client system, the remote storage server and its storage capacities appear as locally attached. In a NAS environment, the client system is aware of the storage server being remote, and can use file-based protocols such as Network File System (NFS) to access the files stored in the remote storage server. The client system's operating system can also provide an abstraction layer that shields the NAS storage from the user applications executing on the client system. During execution, user applications running on the client system can access the storage services provided by the remote storage server in a similar fashion as accessing the client system's local storage devices.

The local and/or remote storage services available to a client system can be disrupted by hardware failures or software errors that occur at the client system, the remote storage server, or the network in between. Data stored on the client system's local storage devices or the network storage server can also be corrupted due to various reasons. Once stored data is no longer available or becomes corrupted during a user application's execution, the operating system and/or the file system often raise exceptions (warnings or error signals) to the user application whenever it attempts to access these stored data. Upon receiving the exceptions, the user application usually aborts its normal operation and tries to process the exceptions instead. If the exceptions are not properly handled, the whole application can terminate abruptly. Even with sophisticated exception handling logics, the user application is often unable to recover from the service disruption or continue its normal operation. In this case, the user application can at best perform a graceful termination.

To restore the disrupted storage services, the failed hardware can be replaced; the faulty software can be repaired or reconfigured; and the corrupted data can be restored from previous backups. Still, in many situations, these storage service restorations may alter the original storage configurations. For example, during restoration, a corrupted storage Logic Unit Number (LUN) may need to be disconnected from the operating system with its allocated space released. The LUN's original storage partitions and/or configurations may be deleted and recreated, and the original drive letter that was assigned to the LUN may no longer be available. Thus, even for user applications that are not accessing the storage services during disruption, the restoration of the disrupted storage services may affect them nevertheless. These user applications may have to be shut-down and re-launched to reconnect to the restored LUN. Otherwise, accessing the no-longer-in-existent or altered storage services may raise further exceptions.

Storage service disruption imposes additional burdens to large-scale mission-critical applications, such as Enterprise Resource Planning (ERP) applications, etc, which are often required to provide continuous availability with minimum downtime. A large-scale application is often implemented with application components distributed to multiple systems and environments. When local or remote storage services are disrupted at one of the systems or environments, the impact could propagate to the application components that are running on other systems or unrelated to storage access. Further, large-scale applications often require a long latency time for shutting down and restarting up. Thus, even though physical data might be preserved via data redundancy at the device or storage server level, the disruption of services and the re-launching process can severely undermine the continuous availability of these applications.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for providing non-disruptive restoration of a storage volume are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To reduce user application downtime, and to reduce unnecessary shutdown and restart of user applications during storage service disruptions, a storage management system can be utilized to provide non-disruptive restoration of the disrupted storage services, while allowing user applications that depend on these services to remain operational. The storage management system manages and monitors the local and/or remote storage services that are accessed by user applications. Upon detecting a disruption of some of these storage services, the storage management system temporarily freezes the input/output (I/O) processes of the user applications that are accessing the disrupted services. Freezing a process temporarily suspends the process from further operation, while allowing the process to maintain its executing status. After the I/O processes are frozen, the disrupted storage services can be restored. If the disruption is caused by data corruption, previously backed-up or mirrored copies of the data can be used to replace the corrupted data.

After restoration, the storage services substantially preserve their original configurations. And, the previously frozen I/O processes can be reactivated (unfrozen) to continue their normal operations, including accessing the now restored storage services. Thus, from the perspectives of the user applications and their I/O processes, except for some impacts on their performance, the restored storage services are substantially the same as the storage services before disruption, and are never disrupted. Since no error exceptions are received, the user applications are not interrupted, nor required to be shut down or re-launched. Further, when the I/O processes affected by storage service disruption are frozen, the applications can still perform the functionalities that do not involve accessing the disrupted storage services. Thus, the user applications can remain, at least partially, in service during the non-disruptive restoration of storage services.

In one embodiment, the storage management system, which contains a volume management module and an application support module, is implemented in a client system. The volume management module interacts with the client system's operating system to monitor and manage the storage services provided by local storage devices as well as remote network storage servers. A storage volume is a logical storage entity that is supported by the operating system of the client system and shields its physical implementation from user applications. The storage volumes are commonly used to offer access to the client system's local storage devices. To integrate remote storage services provided by network storage servers into the client system, the volume management module creates and manages storage volumes for accessing these remote storage services. Thus, regardless of whether a storage volume is mapped to a local device or a remote server, data can be stored or retrieved from the storage volume in a uniformly fashion. The application support module of the storage management system monitors the user applications that are accessing the storage volumes. The volume management module and/or the application support module also manage the backup and restore of data on these storage volumes.

In one embodiment, the storage management system can control the user applications' I/O processes during non-disruptive restoration of these storage services. Once the system detects a disruption of services at a storage volume, it tries to identify and freeze the I/O processes or threads of the user applications that are accessing the disrupted storage volume. The frozen processes or threads remain alive in the client system's operating system environment. After the processes or threads are frozen, the storage management system starts the restoration process by dismounting the disrupted storage volume, thereby preventing the storage volume from being accessed by additional applications or processes during restoration. The dismounted storage volume is still under the control of the volume management module of the storage management system. During restoration, the hardware failures or software errors can be fixed, and corrupted data can be restored from previously backed-up or mirrored copies. Upon restoration of the data, the storage management system re-mounts the storage volume, while ensuring that the configurations of the storage volume remain substantially the same for the user applications. After remounting, the storage management system reactivates (unfreezes) the previously frozen I/O processes or threads, and the applications are allowed to continue their processing, with no awareness of the disruption and restoration of the storage volume.

In one embodiment, during the non-disruptive restoration of the storage volume, any processes or threads of the user applications that are not accessing the disrupted storage volume can still proceed normally. Since the I/O processes to the disrupted storage volumes are halted but not terminated, no costly shutdown or restart of the user applications is necessary. Thus, mission critical applications remain available during and after the non-disruptive restoration of the storage services. Further, the non-disruptive restoration of storage volumes can be fully automated by the storage management system. Upon a detection of storage service interruption, the storage management system can immediately freeze the I/O operations and trigger the restoration process without manual intervention, which further reduces the system downtime.

Figure 1:
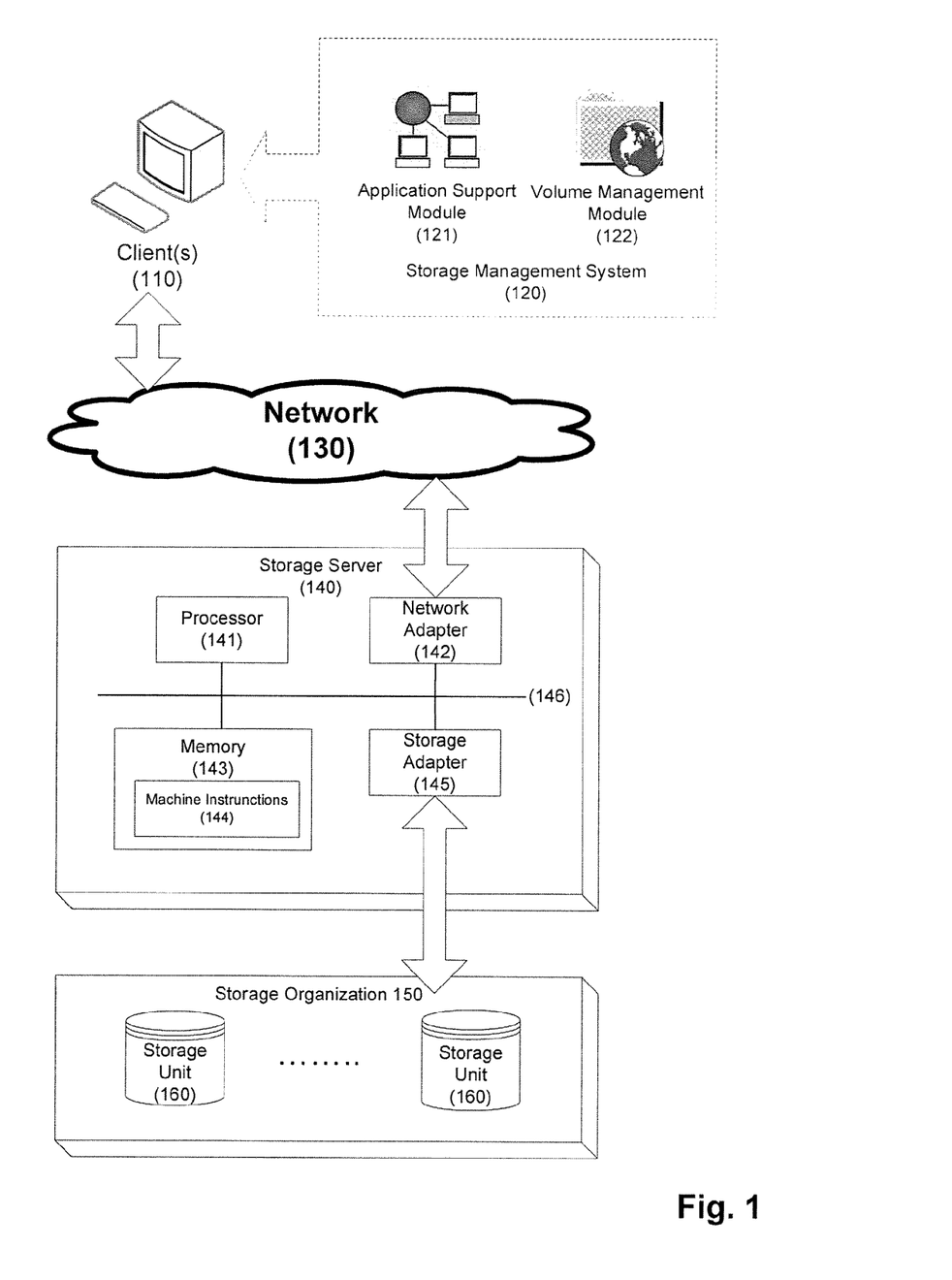
FIG. 1 illustrates a network storage environment in which the present invention can be implemented.

Refer now to FIG. 1, which shows a network storage environment in which the present invention can be implemented. In FIG. 1, a storage server 140 provides data storage services to one or more clients 110 via a network 130. The network 130 may be, for example, a local area network (LAN), wide area network (WAN), metropolitan area network (MAN), global area network such as the Internet, a Fibre Channel fabric, or any combination of such interconnects. A client 110 may be, for example, a conventional personal computer (PC), server-class computer, workstation, handheld computing or communication device, or the like. The network storage environment of FIG. 1 can be referred to as a storage system. Alternatively, a client 110, a storage server 140, or any device that performs storage operations or incorporates the embodiments of the present invention can also be referred to as a storage system.

In one embodiment, the storage server 140 can be a file-level server such as used in a NAS environment, a block-level storage server such as used in a SAN environment, or a storage server which is capable of providing both file-level and block-level services. Further, although the storage server 140 is illustrated as a single unit in FIG. 1, it can have a distributed architecture. For example, the storage server 140 can be implemented with multiple distributed storage servers. It can also include a network module (e.g., "N-module") and a disk module (e.g., "D-module") (not shown), which communicate with each other and/or with other storage servers over an external interconnect. The N-module acts as a front-end of the storage server, exporting services to clients; and the D-module acts as the back-end, managing the underlying storage of the storage server. The N-module and D-module can be contained in separate housings and communicate with each other via network connections. Thus, the N-module and the D-module enable a storage server to be physically separated and distributed across a network. In one embodiment, a storage server 140 can include multiple N-modules and D-modules, each of the N-modules corresponding to one or more D-modules, and each of the D-modules corresponding to one or more N-modules.

In one embodiment, the storage server 140 includes one or more processors 141 and memory 143 connected via an interconnect 146. The interconnect 146 is an abstraction that represents any one or more separate physical buses, point-to-point connections, or both connected by appropriate bridges, adapters, or controllers. The interconnect 146, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C)

bus, or an Institute of Electrical and Electronics Engineers (IEEE) standard 1394 bus, sometimes referred to as "Firewire".

The processor(s) 141 may include central processing units (CPUs) of the storage server 140 and, thus, control the overall operation of the storage server 140. In certain embodiments, the processor(s) 141 accomplish this by executing software or firmware stored in memory 143. The processor(s) 141 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 143 is or includes the main memory of the storage server 140. The memory 143 represents any form of random access memory (RAM), read-only memory (ROM), flash memory (as discussed below), or the like, or a combination of such devices. In use, the memory 143 may contain, among other things, a set of machine instructions 144 which, when executed by processor 141, causes the processor 141 to perform operations to implement embodiments of the present invention. In one embodiment, the client 110 contains processor(s) and memory (not shown) similar to the ones of the storage server 140.

Also connected to the processor(s) 141 through the interconnect 146 are a network adapter 142 and a storage adapter 145. The network adapter 142 provides the storage server 140 with the ability to communicate with remote devices, such as a client 110, and/or other storage servers 140 over the network 130, and may be, for example, an Ethernet adapter or Fibre Channel adapter. The storage adapter 145 allows the storage serve 140 to access the storage units 160 in a storage organization 150, and may be, for example, a Fibre Channel adapter, a SCSI adapter, an Ethernet adapter, or any Fibre Channel Protocol (FCP) and iSCSI protocol adapters. The storage server 140 receives and responds to various read and write requests from one or more clients 110, directed to data stored in or to be stored in the storage organization 150. The storage organization 150 can be a RAID configuration which provides data redundancy and fault tolerance to the data stored in the storage units 160. The storage organization 150 contains multiple storage units 160 that can include, for example, conventional magnetic or optical disks or tape drives; alternatively, they can include non-volatile solid-state memory, such as flash memory, etc.

In one embodiment, a storage management system 120 can be implemented in a client 110 to provide non-disruptive restoration of the storage services for the client 110. The storage management system 120 contains an application support module 121 and a volume management module 122. The volume management module 122 can monitor the client 110's local storage devices. It can also encapsulate the storage services provided by a storage server 140 in storage volumes for the client 110. For the user applications executing on the client 110, the storage volumes which represent the remote storage services can look and act the same as the storage volumes that are associated with local storage devices. The application support module 121 can monitor the user applications running on the client 110 with respect to their utilization of the storage volumes. Details about the application support module 121 and the volume management module 122 are further described below.

Figure 2:
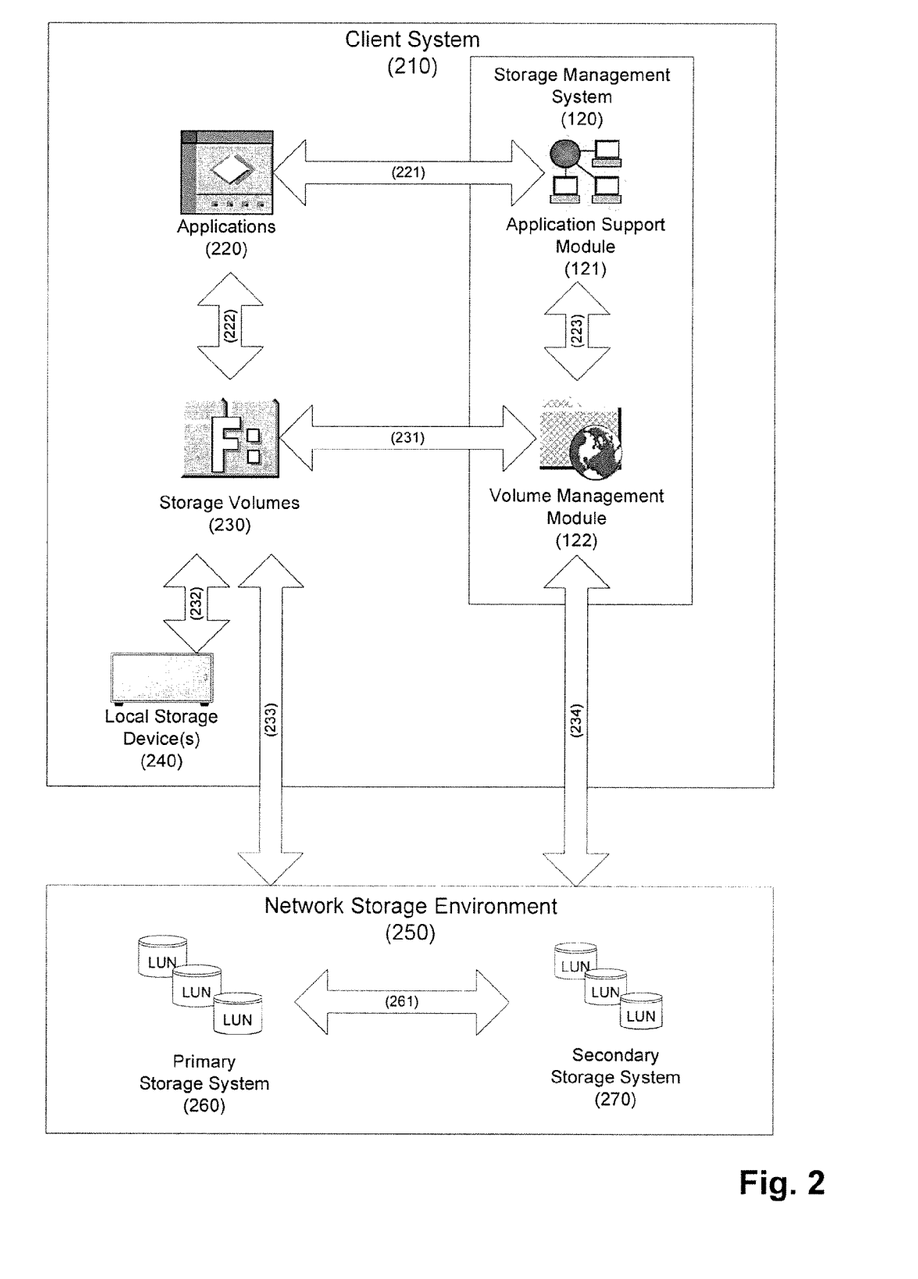
FIG. 2 illustrates exemplary implementation of a storage management system in a client system.

FIG. 2 illustrates an implementation of a storage management system in a client system, in accordance with certain embodiments of the present invention. In FIG. 2, a network storage environment 250 provides network-based data storage services to a client system 210, which can be a client 110 of FIG. 1. The client system 210 contains various modules such as applications 220 and a storage management system 120 of FIG. 1 (which includes an application support module 121 and a volume management module 122 of FIG. 1), etc. These various modules can be implemented as software/firmware programs or hardware components in the client system 210. The client system 210 also contains storage volumes 230 that can be utilized by applications 220 for their data storage needs. In addition, the application support module 121 can also work with a volume management module 122 to manage the storage volumes 230, as well as monitor and control the processes and threads of the applications 220 that are accessing the storage volumes 230.

In one embodiment, the network storage environment 250 can be implemented with one or more network storage servers such as a server 140 of FIG. 1. Alternatively, it can also be implemented with computer systems that provide persistent storage over a network. For example, a computer system having a network file system such as Network File System (NFS), Andrew File System (AFS), Netware Core Protocol (NCP) file system, Server Message Block (SMB) file system, and/or HTTP based file system, etc, can also be implemented as a network storage environment 250. From the perspective of a client system 210, a network storage environment 250 provides remote data storage services.

In one embodiment, a network storage environment 250 includes a primary storage system 260 and a secondary storage system 270, each of which can be implemented with one or more network storage servers. To ensure that data remain available to the client system 210 even in disastrous situations, fault-tolerant data replications 261 are established to transfer data between the primary storage system 260 and the secondary storage system 270, thereby reducing the risk of data loss due to the failure of any one of these two systems. During normal operations, the storage system 260 functions as a primary storage provider in serving the client system 210. The storage system 270 takes on a secondary, standby role, only to replicate data stored and/or updated in the primary storage system 260. The primary and secondary roles can also be switched between these two systems. In one embodiment, the fault-tolerant data replications 261 backup, mirror, and/or restore data between the primary storage system 260 and the secondary storage system and 270. The backed-up or mirrored data maintained in the secondary storage system 270 can later be used to restore the primary storage system 260.

In one embodiment, the network storage environment 250 and its storage systems can expose their storage capacities to an external system, e.g., a client system 210, with one or more virtual storage containers. For the external system, a virtual storage container is a remote, network storage entity that can be mapped to a native storage entity of the external system. The virtual storage containers provided by the network storage environment 250 can be LUNs (Logical Unit Numbers), volumes, qtrees (Quota Trees), or the combination thereof. A LUN can be a logical storage unit corresponding to, for example, a SCSI protocol, a Fibre Channel Protocol (FCP), an iSCSI protocol, or a HyperSCSI protocol. A volume can be a logical storage entity which is created with multiple physical drives, optionally configured under a RAID scheme. Storage space within a volume can be further distributed to one or more qtrees. In addition of being a storage entity, a qtree, or quota tree, is a top-level directory in a volume that provides further configurations, such as security, space usage, and file size controls, etc. Other types of virtual storage containers, such as mount points, RAID groups, physical drives, partitions, etc, can also be configured based on storage spaces provided by one or more storage servers.

In the client system 210, storage services are provided to applications 220 via one or more storage volumes 230. A storage volume 230 is a logical storage entity that is supported by the operating system and/or the file system of the client system 210 and shields its physical implementation from user applications 220. In a WINDOWS® operating system, a storage volume 230 can be a drive with a drive letter (e.g. C, D, F, etc), or a directory under a drive, etc. In a UNIX environment, a storage volume can be a directory, or a file, etc. In one embodiment, storage capacities provided by local storage devices 240 can be mapped to storage volumes 230 via communication channels 232. Local storage devices 240 include physical drives internally installed in the client system 210 or any storage devices that are utilized only by the client system 210. Conventionally, the operating system and/or the file system of the client system 210 create and manage the storage volumes 230 to provide access to the local storage devices 240. Thus, storage volumes that allow access to local storage devices can be referred to as local storage volumes hereinafter.

In one embodiment, a storage management system 120 of FIG. 1, which includes an application support module 121 and a volume management module 122, is implemented in the client system 210. The volume management module 122 provides storage visualization and volume management capabilities, and can be integrated with the client system 210's operating systems, such as WINDOWS, SOLARIS®, LINUX®, AIX®, or HP-UX®, etc. In one embodiment, the volume management module 122 maps the virtual storage containers exposed by the network storage environment 250 to one or more storage volumes 240 via communication channels 233. Thus, storage volumes that allow access to remote storage devices can be referred to as remote storage volumes hereinafter.

For example, in a UNIX operating system, a virtual storage container such as a LUN can be mapped to a directory path under the UNIX file system. The directory path, which is recognizable by the UNIX operating system for storage data access, becomes a remote storage volume that can be used as any other directories in the UNIX operating system. In WINDOWS operating system, virtual storage containers can be mapped and configured as WINDOWS native storage entities, such as drives, volumes, partitions, or virtual volumes, etc. Thus, the volume management module 122 allows simplified and automated storage and data management by integrating remote storage services to the client system 210 through the remote storage volumes 230. Regardless of whether the storage is supplied via a local storage device 240 or a network storage environment 250, a storage volume provides a unified storage entity that shields the physical implementation from the applications.

In one embodiment, by utilizing the volume management module 122 via communication channel 231, remote storage volumes 230 can be added, deleted, mapped, unmapped, or resized online in the client system 210. The volume management module 122 also manages backup and restore of the data stored in the storage volumes. For example, the volume management module 122 can interact with the primary storage system 260 and secondary storage system 270 via communication channels 234 for management of the data replication occurring between these two systems. The volume management module 122 can back up, mirror, or restore data among the client 110's local storage devices 240 and the remote storage systems 260 and 270. Examples of such data replications include, backing-up and restoring data from a local storage device 240 to another local storage device 240; backing-up and restoring data between a local storage device 240 and a network storage environment 250; and backing-up and restoring data between a primary storage system 260 and a secondary storage system 270, etc. The volume management module 122 keeps track of the backed up copies of data for quick restore without human interaction.

In one embodiment, the volume management module 122 is also responsible for mapping, managing and migrating data between new and existing storage volumes. Further, a volume management module 122 can create near-instantaneous point-in-time snapshots of application and user data stored in the storage volumes 240. These snapshots can later be mounted as a new storage volume 240 for fast restoration of the storage volume the snapshots are based on. The volume management module 122 can also monitor the local storage volumes, in addition to the management of remote storage volumes. For example, the volume management module 122 can detect the status of the local storage volumes and the processes and threads that are accessing these local storage volumes. Details about the monitoring of the local storage volumes are further described below.

In one embodiment, as indicated by communication channels 222, the storage volumes 230 can be used by applications 220 executing in a client system 210 for their storage needs. The applications 210 can be, for example, database-centric applications, or mission critical applications such as Enterprise Resource Planning (ERP), etc. The application can also include, for example, email and business collaboration applications such as MICROSOFT EXCHANGE® or LOTUS NOTES®, etc. In one embodiment, the application support module 121 operates in conjunction with the volume management module 122 to monitor applications 220's data storage usage via communication channel 221. For example, the application support module 121 is aware of the processes and/or threads of the applications 220 and which of these processes/threads that are accessing a specific storage volume 230. Alternatively, the volume management module 122 can also identify the processes and/or threads executing on the client system 210 that are accessing the storage volumes 230. Details about identifying processes/threads are further described below.

In one embodiment, the application support module 121 can also integrate with applications 210 to provide data migration, data verification, data cloning, online backup and restore, etc. For example, the application support module 121 is capable of backing-up or restoring application specific data via the volume management module 122 (as indicated by communication channels 223). Further, the application support module 121 and the volume management module 122 can be located in one or more client systems 210, managing the storage volumes on all of these systems. The application support module 121 and/or the volume management module 122 can also provide non-disruptive restoration of storage volumes 240 for applications 210 when storage services provided by these storage volumes are interrupted.

Figure 3:
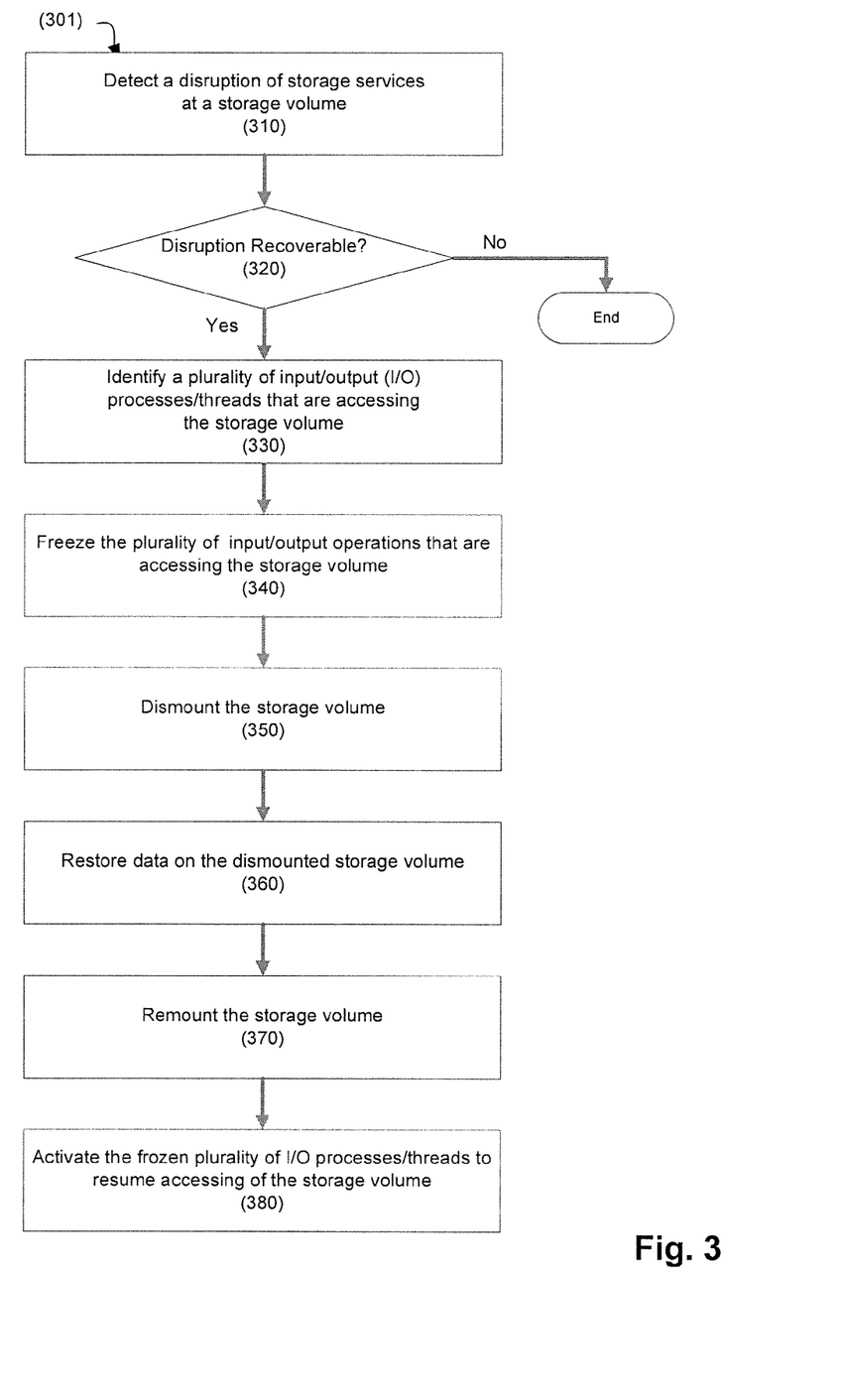
FIG. 3 illustrates a flow diagram of a process for non-disruptive restoration of a storage volume during storage service disruption.

FIG. 3 illustrates a flow diagram of a process 301 for non-disruptive restoration a storage volume in response to storage service disruption, in accordance with certain embodiments of the present invention. The process 301 can be implemented by a storage management system 120 of FIG. 1 and/or executed in a client 110 of FIG. 1. The process 301 can also be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 301 can be stored in memory 143 of FIG. 1, executed by the processor 141 of FIG. 1, and/or implemented in a storage server 140 of FIG. 1.

In FIG. 3, at 310, process 301 detects a disruption of storage services at a storage volume. The disruption can be caused by a hardware failure or software malfunction at a client 110, a network 130, and/or a storage server 140 of FIG. 1. For example, a network storage server which supports a remote storage volume may experience a failure, or the network that connects a client system 110 to the network storage server can be interrupted. Software configurations may also affect the services provided by a storage volume. For example, the operating system that is running on a client 110 can lose its configurations for a storage volume, which in turn interrupts the storage volume's services.

In one embodiment, the disruption of storage services at a storage volume can be detected by the operating system and/or the file system managing the storage volume. The volume management module 122 can monitor the operating system and/or file system and detect the disruption. Disruption can also be detected by the volume management module 122 or the application support module 121 of FIG. 1. For example, a remote storage volume that is managed by a volume management module 122 can report any disruption to the volume management module 122 before raising an exception to the application that is accessing the storage volume. Alternatively, these modules can periodically check the statuses of the local or remote storage volumes and detect a loss of service or an exception before the operating system or application does.

In one embodiment, a disruption of a storage services can also be caused by data corruption. For example, a user or an application bug may inadvertently delete some data, rendering the rest of stored data inconsistent. Thus, a restoring of previously backed-up data may be the only option to resolve the inconsistency. Also, a storage volume disruption can be preemptively triggered by an administrator or controlling software. Planned storage volume disruption allows a non-disruptive restoration of the storage volume before an anticipated hardware/software failure. For example, when a storage volume performance is gradually deteriorating, which indicates that the physical hardware associated with the storage volume might be close to fail, an administrator can proactively "disrupt" the storage volume and trigger the non-disruptive restoration of the data to a replacement storage volume. Alternatively, an administrator may want to switch the data stored in a storage volume with a backed-up or replacement data without adversely affecting the applications that are utilizing the storage volume.

At 320, process 301 determines whether the disruption to the storage volume can be restored without impacting the processes/threads that are utilizing the storage volume. In certain situations, the disruption can be caused by hardware failure that is beyond the process 301's control. For example, if the cause of a storage volume disruption is due to operating system error, the process 301 may not have the ability to restore or repair the operating system on which it is running. Thus, the process 301 may determine that non-disruptive restoration of the storage volume is futile and terminate before further proceeding. Alternatively, if the process 301 determines that the disruption can be non-disruptive restored, then process 301 proceeds to 330.

At 330, the application support module 121 and/or the volume management module 122 of a storage management system identifies the I/O processes and/or threads that are accessing the disrupted storage volume. Since the application support module 121 is aware of the storage volumes used by applications 220 during their executions, it can easily identify the processes and/or threads that are accessing a specific storage volume. For example, an ORACLE® database management system (DBMS) may include a LGWR process to write redo log to a first storage volume, and a DBWR process to write data blocks to a second storage volume, etc. If a disruption of storage services is detected at one of these two storage volumes, the process/thread that is associated with the disrupted storage volume, being either the LGWR process or the DBWR process, can also be identified. Similarly, a driver for a remote storage volume may record the processes and/or threads that are accessing the remote storage volume. Alternatively, the volume management module 122 can monitor the kernel of the operating system that is running on a client system for any storage exception raised, which includes detail information about the processes/threads that caused the raising of the exception.

At 340, once the I/O processes/threads that are accessing the disrupted storage volume are identified, the application support module 121 and/or the volume management module 122 freeze these I/O processes/threads so that their accessing of the disrupted storage volume is temporarily halted. Freezing processes/threads temporarily suspends the processes/threads from further operation, while allowing these processes/threads to maintain their executing status in the operating system. Thus, freezing, or suspending, a process/thread halts the execution of the programming logic associated with the process/thread. The frozen process/thread can appear idle or nonresponsive in the operating system environment. When a process/thread is frozen, it is still considered as a running process/thread in the operating system, and/or remains loaded in the memory and CPU of the system. Freezing can be programmed for any length of time. To prevent a process/thread from being frozen forever, a time-out function can be implemented to un-freeze or activate the process/thread after a fixed amount of time elapses. If the disrupted storage volume is not yet restored, once unfrozen, the process/thread may receive exceptions and be interrupted during their access of the storage volume.

In one embodiment, freezing of a process/thread can be implemented by controlling the specific drivers that are programmed for accessing the storage volumes. For example, when an application tries to open a file or directory through a file handle pointing to a disrupted storage volume, the storage driver that implements the file handle can be instructed by the application support module 121 and/or the volume management module 122 to halt the opening operation on the disrupted storage volume. The process/thread of the application that initiated the handle will not receive a response from the opening operation as long as the opening operation is halted. Thus, the process/thread of the application cannot proceed to perform further operations, and is thereby effectively frozen. To unfreeze or activate the frozen process/thread of the application, the storage driver can be instructed to return a response to the process/thread, thereby allowing the application to continue. A process/thread can also be stopped or made asleep with appropriate operating system calls. For example, in UNIX operating system, a sleep( ) system call can cause the calling process/thread to be suspended/frozen from execution until sleep time elapses or a separate wakeup( ) call is received.

In one embodiment, freezing of a process/thread can be accomplished by setting a low processing priority in the operating system, or by completely "swapping" the process/thread out of the running stack of the operating system. Since in many multi-tasking operating systems, only one active process/thread at any given time can be processed by a CPU, any process/thread that is not assigned a CPU by a scheduler awaits for its turn for processing. Thus, setting a low priority turn prevent the process/thread that is accessing the disrupted storage volume from executing. Similarly, an operating system may swap the process in its entirety (the process/thread's in-memory text, stack and data segments) out of memory. Swapping the process/thread out of an operating system's prevents the process/thread from being allocated with any processing resources. To un-freeze or activate the process/thread, a high priority can be assigned to the process/thread, or the process/thread can be swapped back into the client system's processing memory.

In one embodiment, any processes/threads that are not accessing the disrupted storage volume are not frozen by the process 301. Thus, these processes/threads are free to continue their normal operations without being impacted by the non-disruptive restoration process, as long as they are not trying to access the disrupted storage volume. In addition, the process 301 continues its monitoring of the storage volumes even during a restoration process. Since a storage volume remains disrupted before it being fully restored, when new processes/threads that are trying to access the disrupted storage volume are detected at 320, process 301 can further freeze these newly detected processes/threads during an existing restoration process.

At 350, after all the necessary I/O processes/threads are frozen at 330, the application support module 121 and/or the volume management module 122 dismount the storage volume from the operating system of the client 110. Dismounting a storage volume takes the storage volume out of its storage services. The data on the storage volume are no longer accessible by user applications. However, the storage volume, and/or its hardware representations in the operating system, can still be visible and accessible for configuration purposes. For example, in a WINDOWS operating system, a dismounted storage volume can still be visible from WINDOWS' Disk Management utilities. By utilizing one of these management utilities, an administrator could perform activities such as updating partitions, activating partitions, or format drives, etc. Similarly, in UNIX environment, a dismounted storage volume is no longer "linked" to the file system. Thus, application cannot access the storage volume via root or any other directorial path for data access. However, the storage volume as a device can still be visible by the operating system under "/dev" directory as a device file.

At 360, the application support module 121 and/or the volume management module 122 restores data and storage services on the dismounted storage volume. In one embodiment, if the disruption of the storage volume is due to hardware or software failure, then the hardware device can be replaced, network interruption can be repaired, and/or software setup can be reconfigured. In addition, if the data originally stored in the storage volume is corrupted, the corrupted data can be replaced by backup or mirrored copies. In one embodiment, a volume management module 122 can restore the storage volume from local or remote backed-up/mirrored data. If the data provided by a primary storage system is corrupted, then the volume management module 122 or the application support module 121 of FIG. 2 can restore data from a secondary storage system to the primary storage system.

In one embodiment, the restoring of data on the dismounted storage volume includes mapping the storage volume to a different virtual storage container provided by a network storage environment. Such approach is advantageous especially when the different virtual storage container contains a mirrored copy of the data for the disrupted storage volume. Thus, after restoration, data on the storage volume becomes usable, while not yet available, to the applications, even though the storage volume might have a different configuration or is originated from a different source.

At 370, after the data is restored on the storage volume, the application support module 121 and/or the volume management module 122 remounted the storage volume to the client's operating system. From the perspectives of the applications, the remounted storage volume retains all essential configurations as the previously disrupted storage volume does. For example, the storage volume will retain the same mount name or mount path. In WINDOWS operating system, the storage volume will retain the same drive letter used by the storage volume before it was dismounted. In UNIX operating system, the storage volume can be mounted at the same directory path. Afterward, the remounted storage volume becomes available for data access and storage usage by any authorized applications. Thus, from the perspectives of the frozen user applications, the newly mounted storage volume was never dismounted and remounted.

At 380, the application support module 121 and/or the volume management module 122 activate the I/O processes/threads that are frozen at 330 to resume their accessing of the storage volume. Depending on the mechanisms used at 330 for freezing the I/O processes/threads, activating these I/O processes/threads can be accomplished by returning a response to the opening operation initiated by a file handle; assigning a higher priority to the processes/threads; and/or swapping the processes/threads back to the operating system's executions, etc. Since the remounted storage volumes looks and acts the same as the previously disrupted storage volume, the processes/threads are not aware of the temporarily disruption of storage services during their temporarily frozen period. Thus, these processes/threads can continue their normal operation logics without being interrupted by any exceptions or error handling logics. Except for some impact on their performance, the processes/threads are not required to be terminated or restarted. Thus, for mission critical applications, their availability and uptime are significantly improved during disastrous situations.

In one embodiment, in order to expedite the non-disruptive restoration process, an automated policy can be configured to streamline the restoration process. For example, a redundant storage volume can be dedicated as a standby to store identical and up-to-date data for a storage volume. Once the storage volume is disrupted, the process 301 can automatically perform its restoring by quickly freezing the impacted I/O processes/threads, dismounting the disrupted storage volume, and remounting the redundant storage volume with substantially the same configurations as the dismounted storage volume. Since no restoration of data is necessary for the redundant storage volume, the frozen processes/threads can quickly be activated to access the redundant storage volume with little application frozen time. Thus, the performance of these user applications can be further increased during storage disruption.

Figure 4:
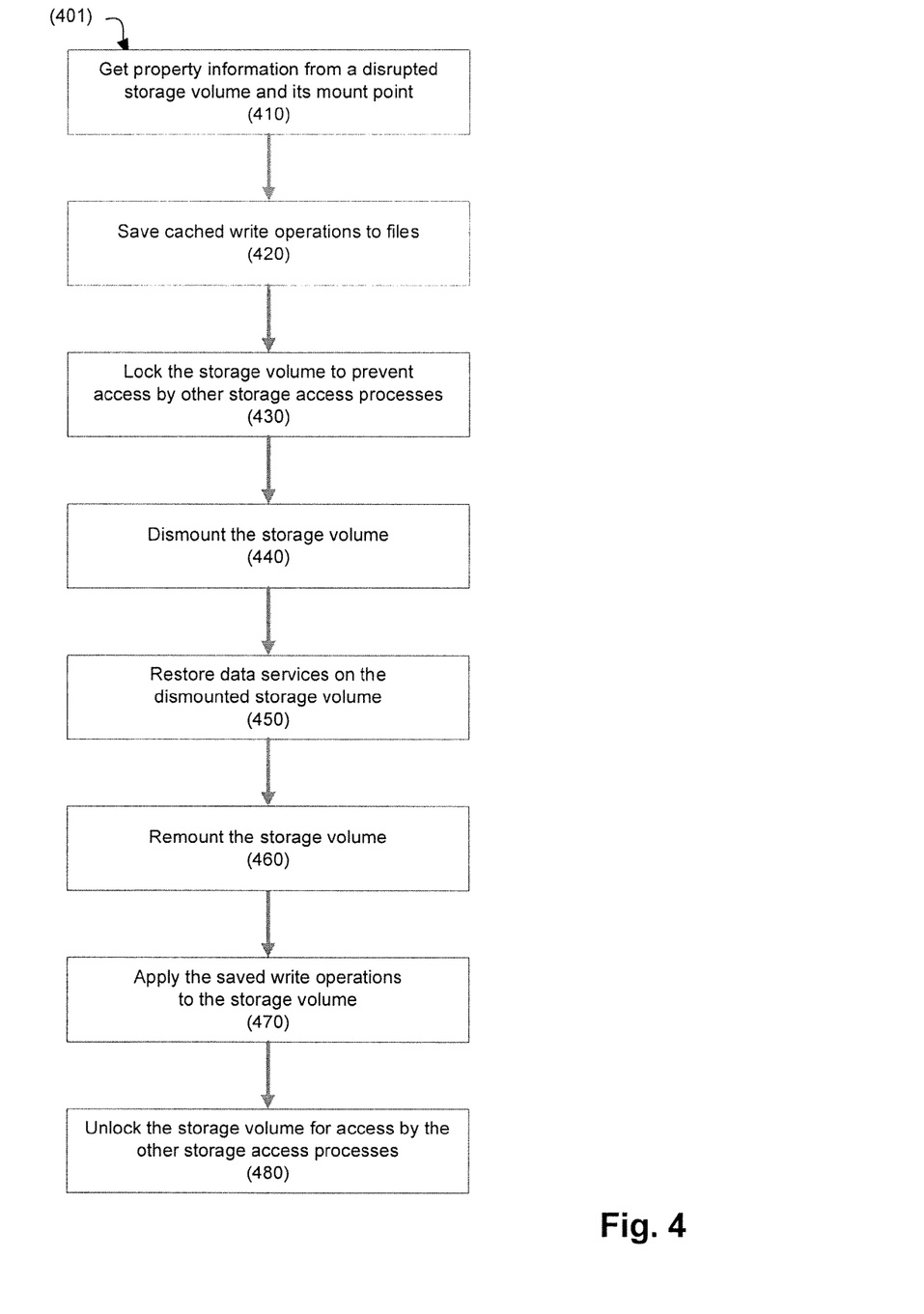
FIG. 4 illustrates a flow diagram of a process for non-disruptive dismounting and mounting of a storage volume.

FIG. 4 illustrates a flow diagram of a process 401 for non-disruptive dismounting and mounting of a storage volume, in accordance with certain embodiments of the present invention. The process 401 can be implemented by a storage management system 120 of FIG. 1, or executed in a client 110 of FIG. 1. The process 401 can also be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 can be stored in memory 143, executed by a processor 141, and/or implemented in a storage server 140 of FIG. 1.

Referring back to FIG. 4, after a storage volume disruption is detected and the processes/threads that are accessing the disrupted storage volume are identified and frozen, process 401 proceeds to 410 to get property information from the disrupted storage volume and its mount point. The property information can later be used to restore and/or remount the storage volume. For example, in a UNIX system, property information for the storage volume and its default mount point may be obtained from an "fstab" file. Additional information such as the type of file system that has been used to access the data in the storage volume, or whether the file system resides on a device that requires network access, etc, can also be ascertained. In a WINDOWS environment, the storage volume and its volume mount information can be obtained from a disk management utility.

At 420, process 401 flushes all cached writes that have not been written to the disrupted storage volume to temporary files. Since a file system managing data storage may temporarily stores multiple write operations in cache memory before periodically flushing these write operations from the cache memory to the storage volume, when a storage volume is disrupted, some of the cached write operations may not have a chance to be flushed to the storage volume. Because from the perspectives of the user applications, these write operations are already committed to the storage, in order to maintain storage consistency, these un-flushed writes can be saved in temporary files and later applied to the storage volume after it resumes its services.

At 430, in order to make sure no more operations and processes can access the storage volume during recovery, an update lock is obtained by the process 401 to ensure that any other write operations or file handles, which also requires the obtaining of a lock on the storage volume before proceeding, are blocked from accessing the storage volume. If the lock cannot be obtained because another process has the lock, process 401 can wait for a fixed amount of time before retrying 430 to obtain the lock. To minimize deadlock, the process 401 can wait for a random amount of time before the retrying.

At 440, once the lock is obtained at 430, process 401 dismounts the storage volume in the same or similar manner as 350 of process 301. At 450, process 401 restores data on the dismounted storage volume in the same or similar manner as 360 of process 301. And at 460, process 401 performs remounting of the storage volume in the same or similar manner as 370 of process 301. At 470, the un-flushed write operations that are temporarily saved in files at 420 can be reapplied to the mounted and now-available storage volume. At 480, data stored in the storage volume are ready for usage, and process 401 unlocks the storage volume to allow other processes and handles to start their data access processes. Afterward, the frozen processes/threads can be activated to resume their access of the storage volume.

Thus, methods and systems for non-disruptive restoration of a storage volume have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable storage medium", as the term is used herein, includes any mechanism that provides (i.e. stores and/or transmits) information in a form accessible by a machine (e.g., a computer, network device, personal digital assistant (PDA), manufacturing tool, any device with a set of one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
mapping, by a volume management module of a client system, a storage container to a local storage volume to enable access to remote storage services provided by the storage container via a network storage server;
detecting, by the volume management module, a failure of the remote storage services; and
restoring, by the volume management module, the remote storage services by:
freezing I/O operations initiated by client applications of the client system that attempt to access the remote storage services;
responsive to freezing the I/O operations, dismounting the storage container while continuing to maintain control of the dismounted storage container by the volume management module;
remounting the storage container in response to data on the dismounted storage container being restored; and
activating the frozen I/O operations to allow the client applications to continue accessing the remote storage services after completion of said restoring, wherein activating the frozen I/O operations includes continuing processing of the I/O operations without requiring the client applications to be restarted.

2. The method of claim 1, wherein the mapping includes:
mounting the storage container; and
establishing an operating system configuration for accessing the remote storage services provided by the storage container via the network storage server.

3. The method of claim 2, wherein establishing the operating system configuration includes assigning a drive letter to the local storage volume.

4. The method of claim 2, wherein the restoring is performed by the volume management module without altering the operating system configuration for accessing the remote storage services.

5. The method of claim 1, wherein the storage container is exposed to the client system by the network storage server.

6. The method of claim 1, wherein activating the frozen I/O operations includes continuing processing of the I/O operations without notifying the client applications of the failure of the remote storage services.

7. The method of claim 1, further comprising:
during the restoring of the storage services, allowing additional I/O operations initiated by the client applications of the client system that are not attempting to access the remote storage services to proceed.

8. The method of claim 1, wherein the storage container exposed by the network storage environment represents a remote storage entity exposed to the client by the network storage server.

9. The method of claim 1, wherein the freezing of the I/O operations includes freezing threads of the client applications that attempt to access the storage services.

10. The method of claim 1, wherein the freezing of the I/O operations includes one or more of: assigning a lower scheduling priority than a current scheduling priority to a thread of the client application that attempts to access the remote storage services or swapping out a thread of the client application that attempts to access the remote storage services.

11. The method of claim 1, further comprising:
restoring data stored on the storage container, by the network storage server, with one or more of data previously backed-up to a second storage container of a network storage environment or with data previously backed-up to the network storage server.

12. A system, comprising:
a memory storing instructions which, when executed by the processor, cause the system to:
map a storage container exposed by a network storage environment to a local storage volume to enable access to remote storage services provided by the storage container via a network storage server, wherein the mapping includes mounting the storage container;
detect a failure of the remote storage services; and
restore the remote storage services responsive to the failure by:
freezing I/O operations initiated by client applications of the client system that attempt to access the remote storage services,
responsive to freezing the I/O operations, dismounting the storage container while continuing to maintain control over the storage container in the volume management module,
remounting the storage container in response to data on the dismounted storage container being restored, and
activating the frozen I/O operations to allow the client applications to continue accessing the remote storage services after completion of said restoring, wherein activating the frozen I/O operations includes continuing processing of the I/O operations without requiring the client applications to be restarted.

13. The system of claim 12, wherein to map the storage container the instructions, when executed by the processor, further cause the system to:
mount the storage container; and
establish an operating system configuration for accessing the remote storage services provided by the storage container via the network storage server.

14. The system of claim 13, wherein the restoring is performed by the volume management module without altering the operating system configuration for accessing the remote storage services.

15. The system of claim 12, wherein the storage container is exposed to the client system by the network storage server.

16. The system of claim 12, wherein activating the frozen I/O operations includes continuing processing of the I/O operations without notifying the client applications of the failure of the remote storage services.

17. A method, comprising:
mapping, by a volume management module of a client system, a storage container exposed by a network storage server to a local storage volume, the mapping including:
mounting the storage container, and
establishing an operating system configuration for accessing the remote storage services provided by the storage container via the network storage server;
detecting, by the volume management module of the client system, a failure of the remote storage services; and
restoring, by the volume management module of the client system, the remote storage services without altering the operating system configuration for accessing the remote storage services by:
freezing client-initiated I/O operations initiated by client applications of the client system that attempt to access the remote storage services;
responsive to freezing the I/O operations, dismounting the storage container while continuing to maintain control over the dismounted storage container by the volume management module;
remounting the storage container in response to data on the dismounted storage container being restored; and
activating the frozen I/O operations to allow the client applications to continue accessing the remote storage services after completion of said restoring, wherein activating the frozen I/O operations includes continuing processing of the I/O operations without requiring the client applications to be restarted.

18. The method of claim 17, wherein establishing the operating system configuration includes assigning a drive letter to the local storage volume, and wherein the restoring is performed by the volume management module without altering the drive letter.

19. The method of claim 17, wherein activating the frozen I/O operations includes continuing processing of the I/O operations without notifying the client applications of the failure of the remote storage services.

20. The method of claim 17, further comprising:
during the restoring of the storage services, allowing additional I/O operations initiated by the client applications of the client system that are not attempting to access the remote storage services to proceed.

21. The method of claim 17, wherein the freezing of the I/O operations includes freezing threads of the client applications that attempt to access the storage services.

22. The method of claim 17, further comprising:
restoring data stored on the storage container, by the network storage server, with one or more of data previously backed-up to a second storage container of a network storage environment or with data previously backed-up to the network storage server.

23. The method of claim 17, wherein to maintain control over the dismounted storage container, the volume management module locks the local storage volume prior to dismounting the storage container, and unlocks the local storage volume after the remounting.

24. The method of claim 17, further comprising:
saving cached write operations intended for the storage volume prior to the restoring of the storage services; and
applying the saved write operations to the storage volume after the restoring of the storage services.

25. The method of claim 17, wherein the dismounting of the storage volume renders the storage volume unavailable for data access.

26. A storing instructions to be executed by a client system having one or more processors, wherein the instructions, when executed by the one or more processors, cause the client system to:

map a storage container exposed by a network storage environment to a local storage volume, the mapping including mounting the storage container in order to access remote storage services provided by the storage container;

detect a failure of the remote storage services; and restore the remote storage services by:

freezing I/O operations initiated by client applications of the client system that attempt to access the remote storage services;

responsive to freezing the I/O operations, dismount the storage container while continuing to maintain control over the dismounted storage container in the volume management module;

remount the storage container in response to data on the dismounted storage container being restored; and         activate the frozen I/O operations to allow the client applications to continue accessing the remote storage services after completion of said restoring, wherein activating the frozen I/O operations includes continuing processing of the I/O operations without requiring the client applications to be restarted.

\* \* \* \* \*

UNITED STATES PATENT AND TRADEMARK OFFICE
CERTIFICATE OF CORRECTION

PATENT NO.       : 8,583,887 B1
APPLICATION NO.  : 12/263328
DATED            : November 12, 2013
INVENTOR(S)      : Manish D. Patel et al.

It is certified that error appears in the above-identified patent and that said Letters Patent is hereby corrected as shown below:

In the Specifications

In column 11, line 2, delete "priority" and insert -- priority instructs the operating system to process other relatively high priority processes/threads, which in --, therefor.

In the Claims

In column 17, line 1, in claim 26, delete "storing" and insert -- non-transitory machine-readable storage medium storing --, therefor.

Signed and Sealed this
Fifteenth Day of April, 2014

Michelle K. Lee
*Deputy Director of the United States Patent and Trademark Office*